UNITED STATES PATENT OFFICE.

EMIL VON PORTHEIM, OF PRAGUE, AUSTRIA-HUNGARY.

GLYCINE DYE.

SPECIFICATION forming part of Letters Patent No. 498,303, dated May 30, 1893.

Application filed May 28, 1892. Serial No. 434,792. (Specimens.) Patented in England December 15, 1891, No. 21,949.

*To all whom it may concern:*

Be it known that I, EMIL VON PORTHEIM, proprietor of the firm Kinzelberger & Co., chemical works, at Prague, a subject of the Emperor of Austria-Hungary, residing at Prague, in the Province of Bohemia, in the Empire of Austria-Hungary, have invented certain new and useful Improvements in the Manufacture of New Coloring-Matters from Naphthyl-Glycines, (for which I have received a patent in England, dated December 15, 1891, No. 21,949;) and I do hereby declare the following to be a full, clear, and exact description of the invention, such as will enable others skilled in the art to which it appertains to make and use the same.

My invention relates to the production of coloring matter from the tetrazo compounds of the diamines, and it consists in a novel process of producing such coloring matter, and in the product of such process.

I have observed that alpha and beta naphthylglycine prepared according to the description of O. Jolles, *Ber.* XXII, p. 2372, will readily combine with a tetrazo compound of the diparadiamines of the diphenyl series and produce coloring matter of great technical value, as they have the property of dyeing cotton without a mordant, or directly in an alkaline bath.

If one molecule of a paradiamine is converted in a well known manner into its tetrazo compound and is then caused to act upon two molecules of either alpha or beta naphthylglycine in an alkaline acetic or alcoholic solution, a corresponding tetrazo dye is readily and speedily formed. If, however, the tetrazo compound is caused to act upon only one molecule of one of the two glycines, intermediate insoluble products are formed, that still possess a free diazo group and are therefore capable of reacting upon a molecule of a phenol, amine, naphthol, or their sulpho or carbo-acids and other substitution products, resulting in the formation of a series of different or mixed dyes. The series of mixed dyes can also be obtained by causing one molecule of one of the glycines to react upon an intermediate product obtained by the reaction of one molecule of a tetrazo compound upon one molecule of an amine or phenol, or a substitution product thereof. It is immaterial in so far as the final result is concerned, whether the combination with the glycine is effected first or afterward.

In the production of dyes although there is no perceptible difference in the action of the two glycines as both combine readily and rapidly with the tetrazo compounds, yet the products obtained differ materially in their properties. Thus, for example, coloring matter obtained by the action of alpha naphthylglycine upon a tetrazo compound of a paradiamine, dyes cotton a blue red and is readily soluble in water, while the coloring matter obtained when beta naphthylglycine is employed is insoluble in water. Generally speaking, in the use of beta naphthylglycine one or more additional sulpho groups are required in order to obtain a product that is soluble in water.

The coloring matter obtained in the use of alpha naphthyl glycine in the process shows the property of alpha naphthylamine in that they are affected by acids, while the coloring matter obtained by the use of beta naphthylglycine is substantially acid proof, and these properties can be readily determined in the case of the alpha dyes in the aqueous or alcoholic solution, and in the case of the beta dyes in the alcoholic solution, as both dyes are readily soluble in alcohol with the unsulphonated paradiamines.

In order that my invention may be fully understood I will now proceed to describe the manner in which the process may be carried out by the following examples.

First: 18.4 kilos of benzidine or a like quantity of an equivalent salt is converted into a tetrazo compound by the addition thereto of fifty kilos hydrochloric acid of thirty-three per cent., and 13.8 kilos sodium nitrite, whereby tetrazodiphenylchloride is obtained, which is slowly mixed under constant stirring with a solution of 40.2 kilos alphanaphthylglycine, which solution is kept alkaline by means of carbonate of soda. After a short time the reaction is completed and the coloring matter formed, which latter is filtered off and dried, said reaction taking place according to the following equations:

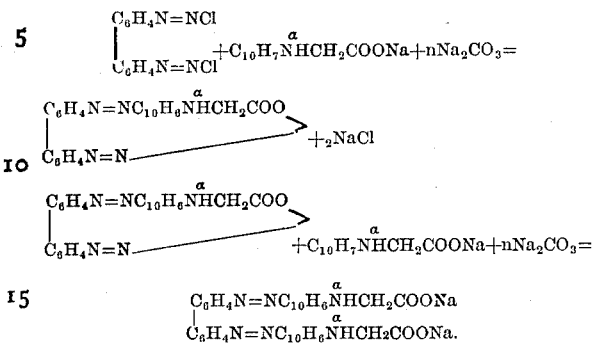

The coloring matter is obtained in the form of a dark powder that is readily soluble in water, and dyes cotton a blue red in an alkaline bath, the coloring matter being readily taken up by the cotton.

Second: The tetrazo compound obtained as above referred to is mixed with an alkaline solution of 20.1 kilos of alpha naphthylglycine, i. e., one molecule instead of two as in the above example, the tetrazo compound being rapidly used up if the mixture is effected under constant stirring, whereby an insoluble intermediate product is obtained in the form of a dark precipitate according to the following equations:

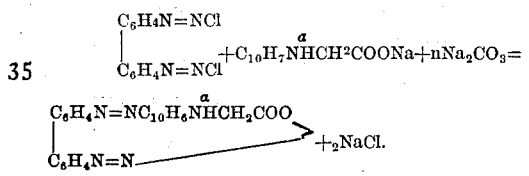

If 24.5 kilos of betanaphthylamine betamonosulphonate of soda is now mixed with the above in soluble product or compound and the whole stirred for some time, a tetrazo dye will be obtained that differs from that obtained from two molecules of either alpha or beta naphthylglycine both in color, which is more yellowish, and in its greater resistance to the action of acids, the reaction taking place according to the following equations:

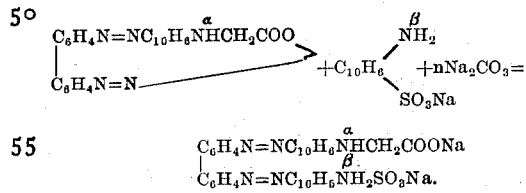

Third: 24.6 kilos benzidine sulphone are converted in a well known manner into a tetrazo compound by means of 13.8 kilos sodium nitrite, and said tetrazo compound is slowly mixed with 40.2 kilos of naphthylglycine kept alkaline by means of carbonate of soda. The coloring matter forms at once as a dark precipitate which dyes cotton blue in an alkaline bath, the tint being that of the well-known azo blue, the reaction taking place according to the following equations:

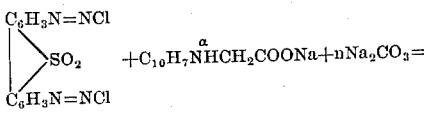
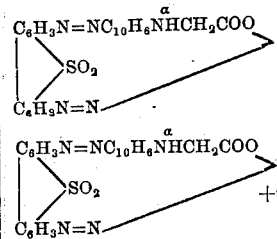
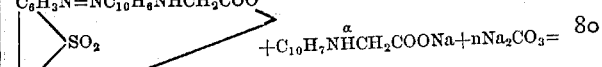
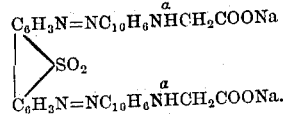

Fourth: 23.6 kilos of benzidine monosulpho acid are converted in an acid solution into a tetrazo compound or body by means of 13.8 kilos of sodium nitrite, the tetrazo compound being then mixed with an alkaline solution of 40.2 kilos of a naphthylglycine the coloring matter also forming at once, and is readily soluble in water and dyes cotton a redish blue color. This dye stuff is not readily affected by acid, and is readily taken up by the fibrous material.

In the following table I have enumerated a series of dyes obtained by my process which have been found of the greatest chemical value.

|  |  | Color. | Water. | Alcohol. |
|---|---|---|---|---|
| Benzidine | alphaglycine | blue red | soluble | soluble. |
| Benzidine | betaglycine | blue red | insoluble | soluble. |
| Tolidine | alphaglycine | red | soluble | soluble. |
| Tolidine | betaglycine | blue red | insoluble | soluble. |
| O. m. tolidine | betaglycine | red |  | soluble. |
| Benzidine sulphone. | alphaglycine | blue | soluble | soluble. |
| Benzidine sulphone. | betaglycine | blue | insoluble | soluble. |
| Benzidine monosulpho-acid. | alphaglycine | blue red | soluble |  |
| Benzidine monosulpho-acid. | betaglycine | blue red | soluble |  |
| Benzidine di-sulpho-acid. | alphaglycine | blue red | soluble |  |
| Benzidine di-sulpho-acid. | betaglycine | blue red | soluble |  |
| Benzidine sulphone di-sulphonic acid. | alphaglycine | blue | soluble |  |
| Benzidine sulphone di-sulphonic acid. | betaglycine | blue | soluble |  |

The coloring matters obtained as above described have the following distinguishing characteristics:

For example, the coloring matter obtained by the reaction of one molecule of benzidine upon two molecules of alpha naphthylglycine is the first technically valuable tetrazo dye held in an aqueous solution by the group $CH_2COONa$ in the amido group.

The blue dye from benzidine sulphone and alpha glycine is the only blue dye for dyeing cotton that is not a napthol derivative except sulpho azurine.

These dyes offer special advantages in that derivatives of alpha and beta naphthylamines are here dealt with, which in addition to their great purity and good taking quality offer greater resistance to the alkalies than the tetrazo dyes derived from naphthols, while the tint or depth of color is equal to that of the last-named dyes but more brilliant. Thus the coloring matter obtained from benzidine and alphaglycine may be compared in color or tint with Congo corinth G, while the coloring matter obtained from benzidine sulphone and alphaglycine may be compared with azo blue, but both the Congo corinth G, and the azo blue are of a much duller color than the glycine dyes, and they are also much more sensitive to the action of alkalies than said glycine dyes.

Having thus described my invention, what I claim as new therein, and desire to secure by Letters Patent, is—

1. The herein-described process of obtaining direct dyeing dyes by the combination of a tetrazo compound of a diamine with a glycine, as set forth.

2. The herein-described process of obtaining direct dyeing dyes by the combination of a tetrazo compound of a dipara-diamine with alpha or beta naphthylglycine, as set forth.

3. The herein-described process of obtaining direct dyeing dyes by the combination of one molecule of a tetrazo compound of a diamine or its specified equivalent with one molecule of naphthylglycine, and combining the product of the reaction with one molecule of a suitable body, as an amine, as set forth.

4. The herein-described blue to red tetrazo glycine dyes, having the property of dyeing cotton without a mordant, being generally soluble in water and more or less soluble in alcohol and not readily affected by alkalies.

In testimony whereof I affix my signature in presence of two witnesses.

EMIL VON PORTHEIM.

Witnesses:
FERDINAND KNERFEL,
ADOLPH FISCHER.